(12) United States Patent
Conrad

(10) Patent No.: US 11,672,395 B2
(45) Date of Patent: Jun. 13, 2023

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 17/142,583

(22) Filed: Jan. 6, 2021

(65) Prior Publication Data

US 2022/0211233 A1    Jul. 7, 2022

(51) Int. Cl.
| | |
|---|---|
| *A47L 9/16* | (2006.01) |
| *B01D 45/08* | (2006.01) |
| *A47L 5/24* | (2006.01) |
| *A47L 9/12* | (2006.01) |
| *B01D 50/20* | (2022.01) |
| *B01D 46/52* | (2006.01) |

(52) U.S. Cl.
CPC .............. *A47L 9/1608* (2013.01); *A47L 5/24* (2013.01); *A47L 9/122* (2013.01); *A47L 9/1666* (2013.01); *A47L 9/1683* (2013.01); *B01D 45/08* (2013.01); *B01D 46/521* (2013.01); *B01D 50/20* (2022.01); *B01D 2279/55* (2013.01)

(58) Field of Classification Search
CPC ...... A47L 9/1608; A47L 9/122; A47L 9/1666; A47L 9/1683; A47L 5/24; A47L 9/127; A47L 9/1616; B01D 50/20; B01D 45/08; B01D 46/521; B01D 2279/55
USPC ........................................................ 15/344
See application file for complete search history.

(56) References Cited

U.S. PATENT DOCUMENTS

| | | | |
|---|---|---|---|
| 6,368,373 B1 | 4/2002 | Mueller | |
| 10,064,530 B2* | 9/2018 | Krebs | ........................ A47L 9/12 |
| 2005/0005390 A1* | 1/2005 | Lee | ........................ A47L 9/1666 |
| | | | 15/347 |
| 2006/0278087 A1 | 12/2006 | Sepke et al. | |
| 2007/0074368 A1 | 4/2007 | Genoa et al. | |
| 2007/0289444 A1 | 12/2007 | Tsuchiya | |
| 2019/0090701 A1 | 3/2019 | Tonderys et al. | |
| 2019/0282049 A1 | 9/2019 | Conrad et al. | |
| 2019/0320862 A1 | 10/2019 | Conrad | |

(Continued)

FOREIGN PATENT DOCUMENTS

CA         2479475 C         6/2008

OTHER PUBLICATIONS

International Search Report and Written Opinion, received in connection to co-pending international patent application No. PCT/CA2022/050002, dated Apr. 25, 2022.

*Primary Examiner* — Don M Anderson
*Assistant Examiner* — Caleb Andrew Holizna
(74) *Attorney, Agent, or Firm* — Philip C. Mendes da Costa; Bereskin & Parr LLP/S.E.N.C.R.L., s.r.l.

(57) ABSTRACT

A surface cleaning apparatus having an air flow path; a suction motor positioned in the air flow path; an air treatment chamber provided in the air flow path; and a porous filter provided in the air treatment chamber and including an outlet passage from the air treatment chamber. An air impermeable impact wall in the air treatment chamber is opposed to an inlet into the air treatment chamber. At least a portion of the impact wall or a deflecting portion of a wall defining part of the front end of the air treatment chamber imparts a circular flow to air entering the air treatment chamber.

16 Claims, 14 Drawing Sheets

(56) References Cited

U.S. PATENT DOCUMENTS

| | | |
|---|---|---|
| 2020/0253437 A1 | 8/2020 | Conrad et al. |
| 2020/0324302 A1 | 10/2020 | Conrad |
| 2020/0324303 A1 | 10/2020 | Conrad |
| 2021/0127919 A1* | 5/2021 | Mathias .................. A47L 9/066 |
| 2022/0133107 A1* | 5/2022 | Lawrence ............. A47L 9/1436 |
| | | 55/367 |

* cited by examiner

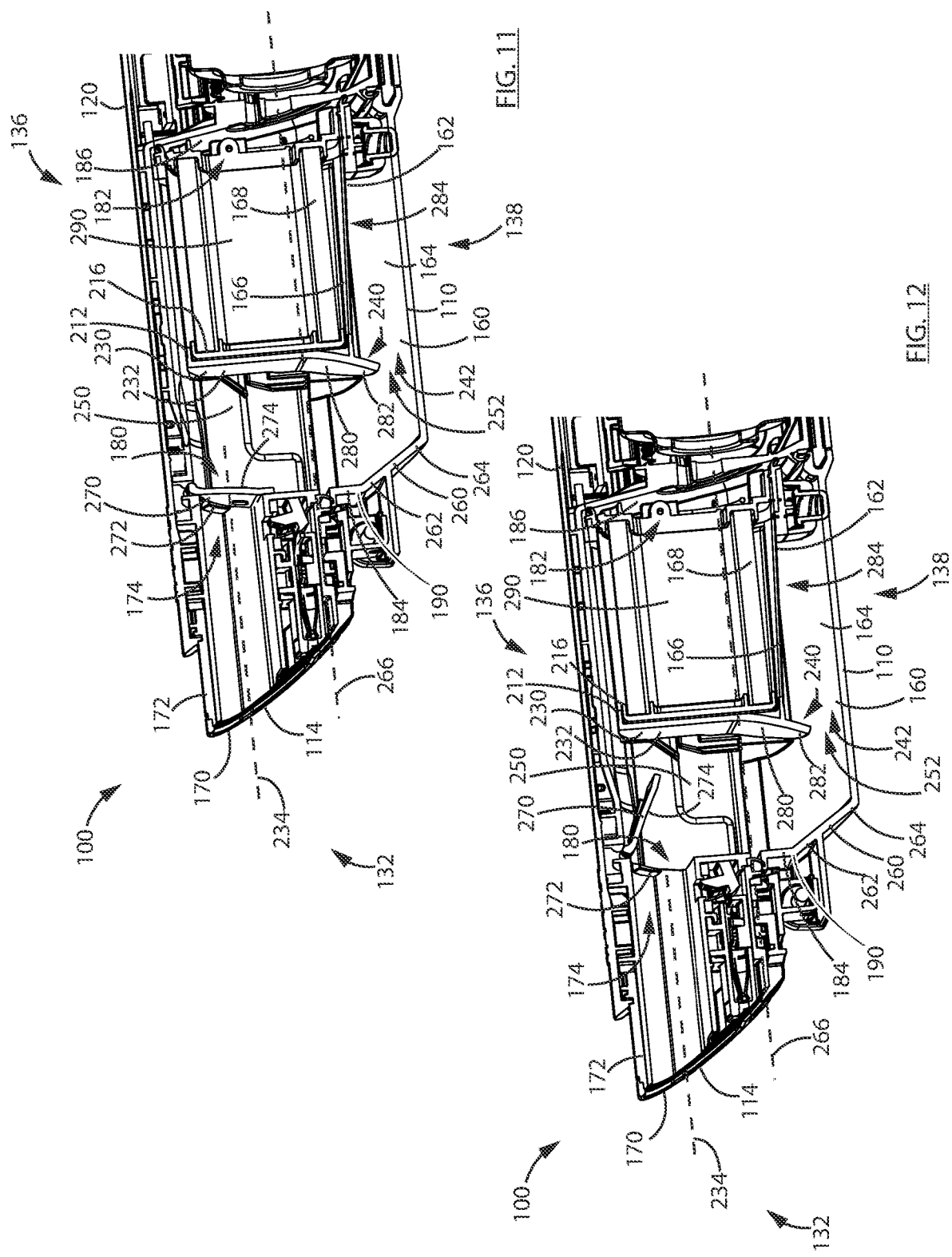

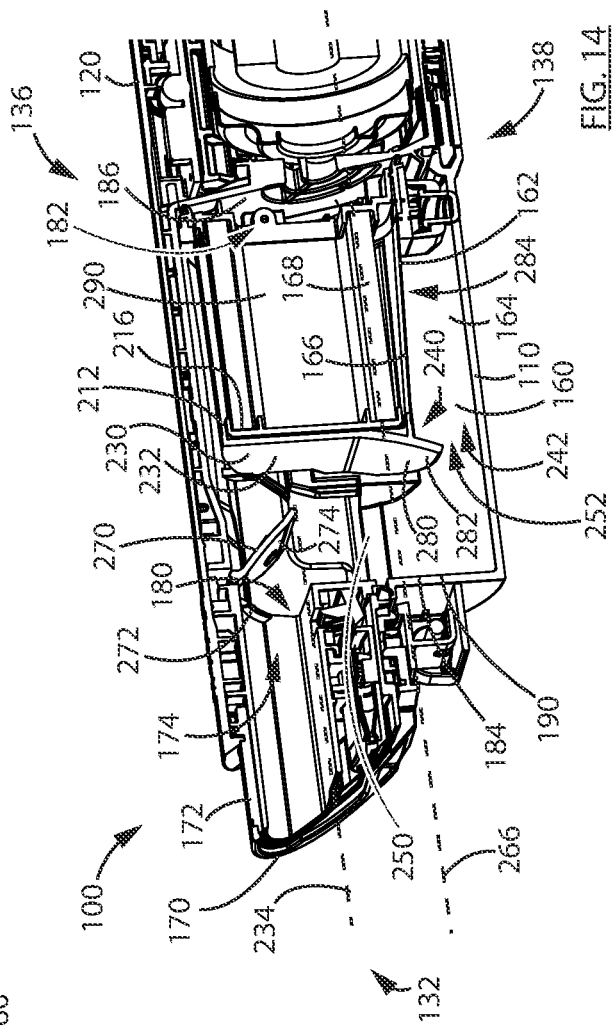
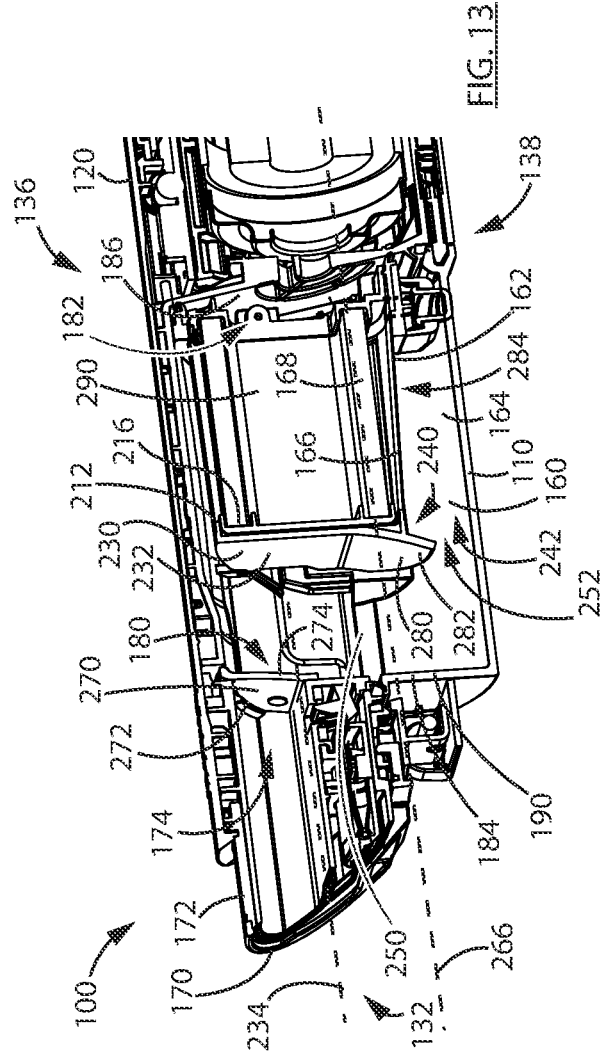

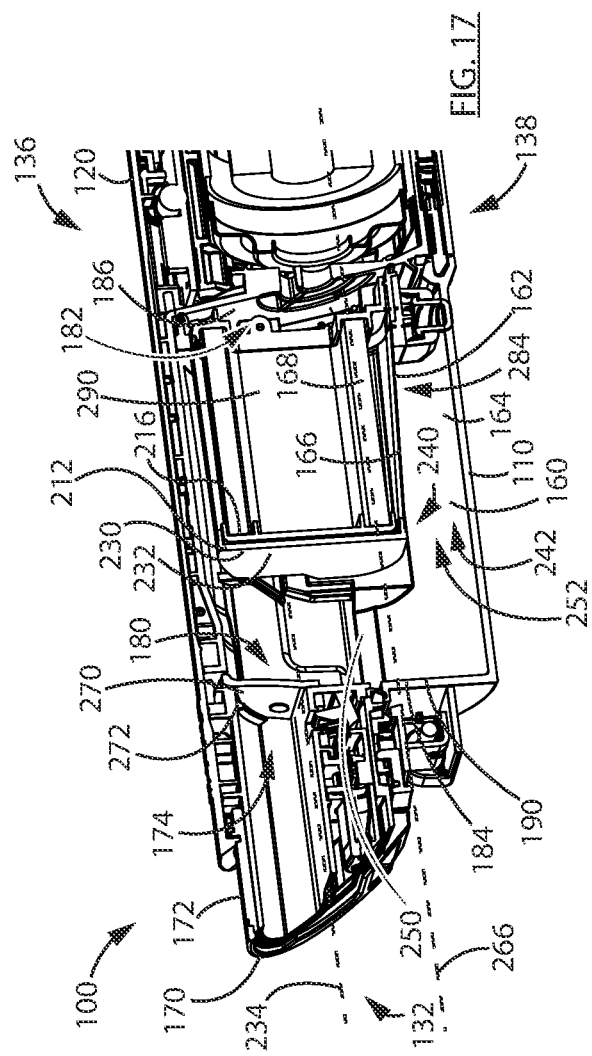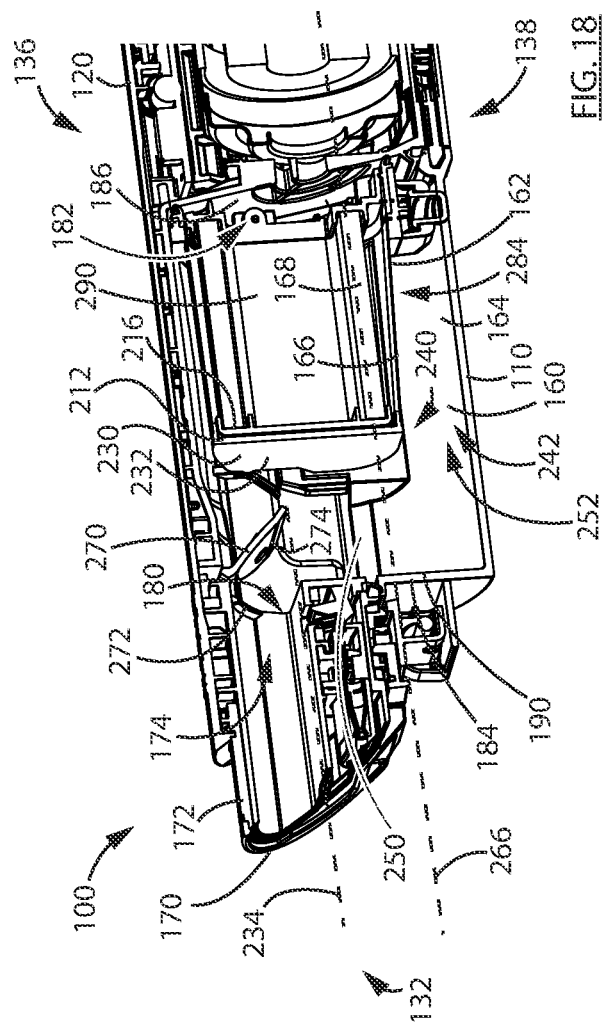

SURFACE CLEANING APPARATUS

FIELD

This disclosure relates generally to surface cleaning apparatus, and particularly to surface cleaning apparatus having an impact wall in an air treatment chamber.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carryable surface cleaning apparatus such as hand vacuums. Further, various designs for hand vacuum cleaners, including battery-operated hand vacuum cleaners are known in the art.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with an aspect of this disclosure, a surface cleaning apparatus has an air treatment chamber with an air inlet and an air outlet, which comprises a porous filter member (e.g., a screen or filter media). An impact wall, which faces the air inlet, is configured to inhibit incoming air passing directly through the air treatment chamber to the air outlet. The porous filter member is downstream of the impact wall. A wall portion, which may be the impact wall or a portion of the impact wall or an angled wall in the air treatment chamber, causes a change the direction of air flow in the air treatment chamber. This change in flow causes a recirculating flow, which may be a generally circular flow, in the air treatment chamber. The recirculating flow may assist in gathering large debris, e.g., elongate material such as hair and other fibers, into a ball or clump of material. This ball or clump of material may be retained in the air treatment chamber forward (upstream) of the porous filter member, e.g., between the air inlet and the impact wall. Accordingly, some of the large debris may be prevented from reaching the porous dirt separator and wrapping around the porous filter member. This may increase the performance of the air treatment chamber.

In some embodiments, the gathered fibers may form a clump in a location spaced from the porous dirt separator, and the clump may further filter air prior to the air reaching the porous dirt separator.

The wall portion imparting the recirculating flow may be used in combination with the impact wall. The air treatment chamber may be primarily a momentum separator in which dirt is separated from the inflow air stream by gravity due to the air flow rate decreasing as it enters the air treatment chamber and/or a change in the direction of the air flow as it travels through the air treatment chamber. The impact wall may be arranged downstream of the chamber air inlet to the air treatment chamber. The impact wall may be opposed to the inlet and may face the air inlet. Accordingly, the impact wall may be arranged such that air entering the air treatment chamber impacts the impact wall (i.e., is deflected by the impact wall), rather than being directed along the impact wall. In some embodiments, a chamber with an impact wall may facilitate a more compact and/or efficient or effective surface cleaning apparatus (e.g., more compact than an apparatus including a full cyclone).

The wall portion imparting the recirculating flow may be one or more of an openable door angled into an air flow stream when opened, an angled lower end of the impact wall, and an angled lower wall portion of a front wall of the chamber.

In some embodiments, the openable door at the inlet of the air treatment chamber has an operating position in which the openable door is moved (e.g., lifted) out of the way of air entering the air treatment chamber. Lifting the openable door out of the way of the incoming air may reduce back pressure and increase the air flow rate of air through the apparatus. Accordingly, if no openable door is provided or if the openable door is positioned out of the incoming air flow stream during operation of the surface cleaning apparatus, the recirculating flow may be imparted by one or both of the angled lower end of the impact wall and the angled lower wall portion of the front wall of the chamber, and not by the openable door.

In some embodiments, the air treatment member includes a porous filter member through which the air flow passes prior to leaving the chamber. The porous filter member may be one or more layers of a porous filter media. The porous filter member may be a tube-shaped member (e.g., conical or cylindrical) with optional longitudinally extending pleats. A pleated filter media may be arranged with the longitudinal axis of the filter media generally parallel with an axis of rotation of a suction motor of the surface cleaning apparatus and/or the axis of an inlet passage. The tube-shaped member may have first and second opposed ends, one of which may be closed and the other open to an outlet port of the chamber such that the air flows into an interior volume of the filter member through the pleated walls and out through an end through the chamber outlet. A pleated filter member may present a greater surface area for receiving air flow. Pleats extending generally parallel to the axis of rotation of the suction motor may also contribute to an increased surface area without unduly increasing the height and/or width of the surface cleaning apparatus (i.e., compared to having the pleated filter transvers to the axis).

The air treatment chamber may have a treatment volume upstream of the filter member (e.g., upstream of an impact wall under which the air must pass to reach the filter member). The filter member and the treatment volume may be sized relative to one another such that the air is able to move through the treatment volume of the air treatment member fast enough for a circular flow to develop. In some embodiments, the volume of air treatable by the porous filter member is sufficient to minimize backpressure. The volume of air treatable by the porous filter member may be a function of the surface area (e.g., the surface area of the porous filter member) and/or an interior volume of a hollow porous filter member.

In accordance with one aspect of this disclosure, there is provided a surface cleaning apparatus comprising:
   (a) an air flow path extending from a dirty air inlet to a clean air outlet, the air flow path comprising an inlet conduit having an outlet port and an inlet conduit axis;
   (b) a suction motor positioned in the air flow path;
   (c) an air treatment chamber provided in the air flow path, the air treatment chamber comprising an upper end, a lower end, a front end having an air inlet, a rear end, a longitudinal axis extending between the front and rear ends of the air treatment chamber and a porous filter member provided in the air treatment chamber rearward of the front end, the porous filter member comprising an outlet passage from the air treatment chamber, the porous filter member having an interior volume; and, (d) an air impermeable impact wall opposed to the outlet port of the inlet conduit and forward of the porous filter member, the impact wall having a lower end which is spaced from the lower end of the air treatment chamber whereby air flow entering the air treatment chamber from the inlet conduit is directed towards the impact wall, wherein at least a portion of the impact wall or a deflecting portion of a wall defining part of the front end of the air treatment chamber imparts a circular flow to air entering the air treatment chamber, and wherein at least some of the air travels rearwardly between the lower end of the impact wall and the lower end of the air treatment chamber to the porous filter member.

In any embodiment, at least 75% of the air may travel rearwardly between the lower end of the impact wall and the lower end of the air treatment chamber to the porous filter member.

In any embodiment, the air treatment chamber may comprise a treatment volume positioned between the front end of the air treatment chamber and the impact wall and a gap between the lower end of the impact wall and the lower end of the air treatment chamber may define a sole passage from the treatment volume to the porous filter member.

In any embodiment, the front end may comprise a front wall and the deflecting portion may comprise a lower angled wall portion of the front wall, the lower angled wall portion having an upper end that is positioned forward of a lower end of the lower angled wall portion.

In any embodiment, the lower angled wall portion may extend forwardly at an angle of 20° to 70°, optionally 30° to 60°, from a plane that is transverse to the longitudinal axis.

In any embodiment, the deflecting portion may comprise a directing member associated with the outlet port of the inlet conduit, wherein, in operation, the directing member is in an operation position in which the directing member extends axially inwardly and downwardly at an angle to the longitudinal axis and is positioned to be impacted by air travelling through the inlet conduit.

In any embodiment, the deflecting portion may comprise a portion of the impact wall that extends downwardly and forwardly at an angle to a plane that is transverse to the longitudinal axis.

In any embodiment, the directing member may comprise an openable door provided at the outlet port of the inlet conduit, and the openable door may be moveable from a closed position in which the moveable door closes the inlet conduit and the operating position.

In any embodiment, in the operating position, the directing member may be at an angle of at least 5°, optionally 10°, optionally 15° from the longitudinal axis.

In any embodiment, the portion of the impact wall may extend downwardly and forwardly at an angle of 5° to 25° to the plane that is transverse to the longitudinal axis.

In any embodiment, the portion of the impact wall may comprise a lower lip portion of the impact wall.

In any embodiment, the lower lip portion may extend below a lower end of the porous filter member.

In any embodiment, the front end may comprise an openable door provided at the outlet port of the inlet conduit, the openable door moveable from a closed position in which the moveable door closes the inlet conduit and the operating position in which the openable door extends generally axially inwardly and, at least:

(a) the front end comprises a front wall and the deflecting portion comprises a lower angled wall portion of the front wall, the lower angled wall portion having an upper end that is positioned forward of a lower end of the lower angled wall portion; or (b) the deflecting portion comprises a portion of the impact wall that extends downwardly and forwardly at an angle to a plane that is transverse to the longitudinal axis.

In any embodiment, the air treatment chamber may comprise a treatment volume positioned between the front end of the air treatment chamber and the impact wall and the treatment volume may be 0.25 to 3 times the interior volume, optionally 0.5 to 2.25 times the interior volume, or optionally 1.0-1.5 times the interior volume.

In any embodiment, the porous filter member may comprise a pleated filter media removable mountable in a porous filter media holder wherein, when the pleated filter media is positioned in the filter media holder, pleats of the filter media extend generally axially.

In any embodiment, the surface cleaning apparatus may be a hand vacuum cleaner.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 11 is a cross sectional view of a forward portion of a surface cleaning apparatus according to a further embodiment;

FIG. 12 is a cross sectional view of the surface cleaning apparatus of FIG. 11 with a directing member opened;

FIG. 13 is a cross sectional view of a forward portion of a surface cleaning apparatus according to a further embodiment;

FIG. 14 is a cross sectional view of the surface cleaning apparatus of FIG. 13 with a directing member opened;

FIG. 17 is a cross sectional view of a forward portion of a surface cleaning apparatus according to a further embodiment; and, FIG. 18 is a cross sectional view of the surface cleaning apparatus of FIG. 17 with a directing member opened.

Figure 1:
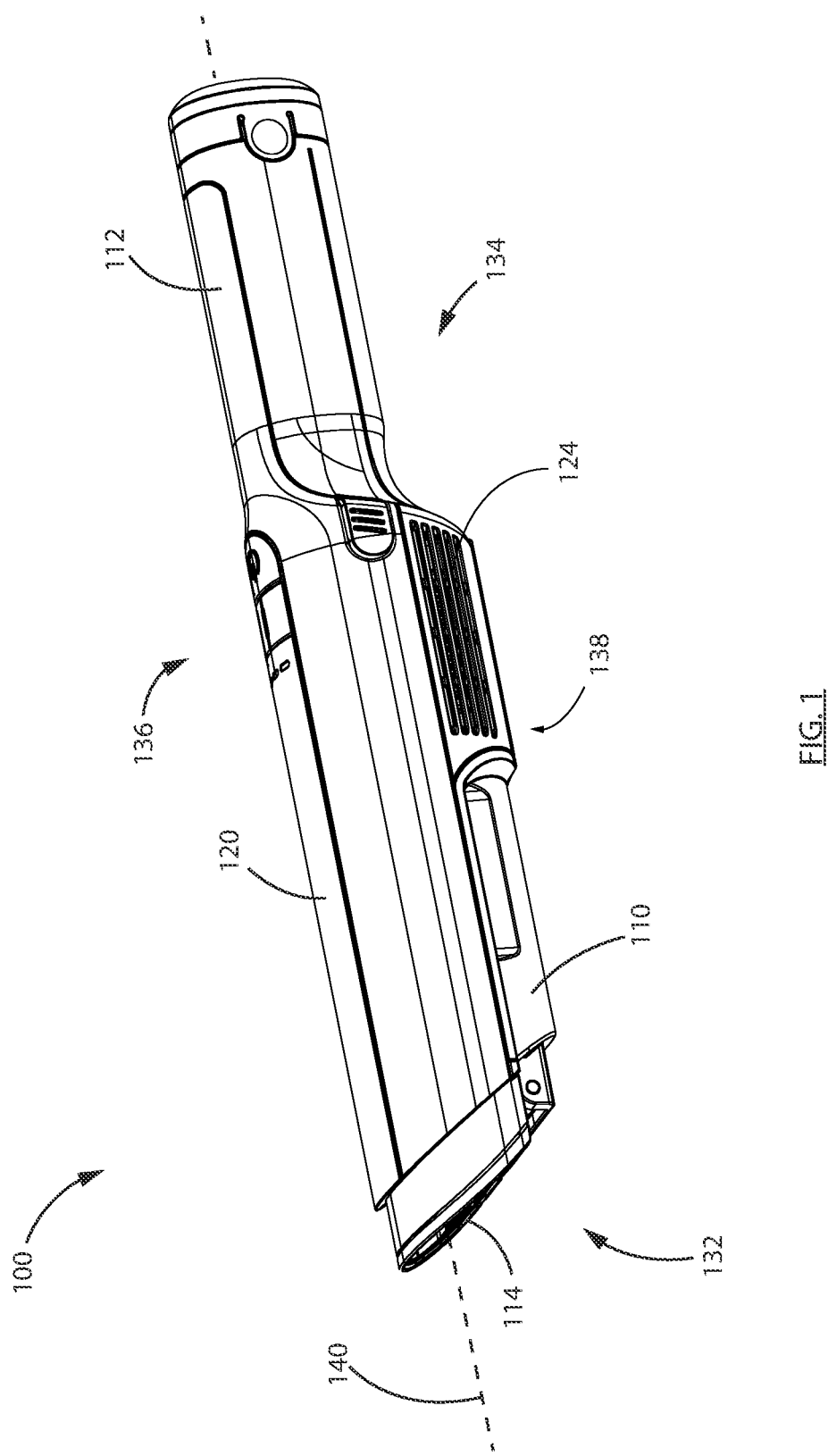
FIG. 1 is a side perspective view of a surface cleaning apparatus according to an embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method, or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

General Description of a Surface Cleaning Apparatus

Figure 2:
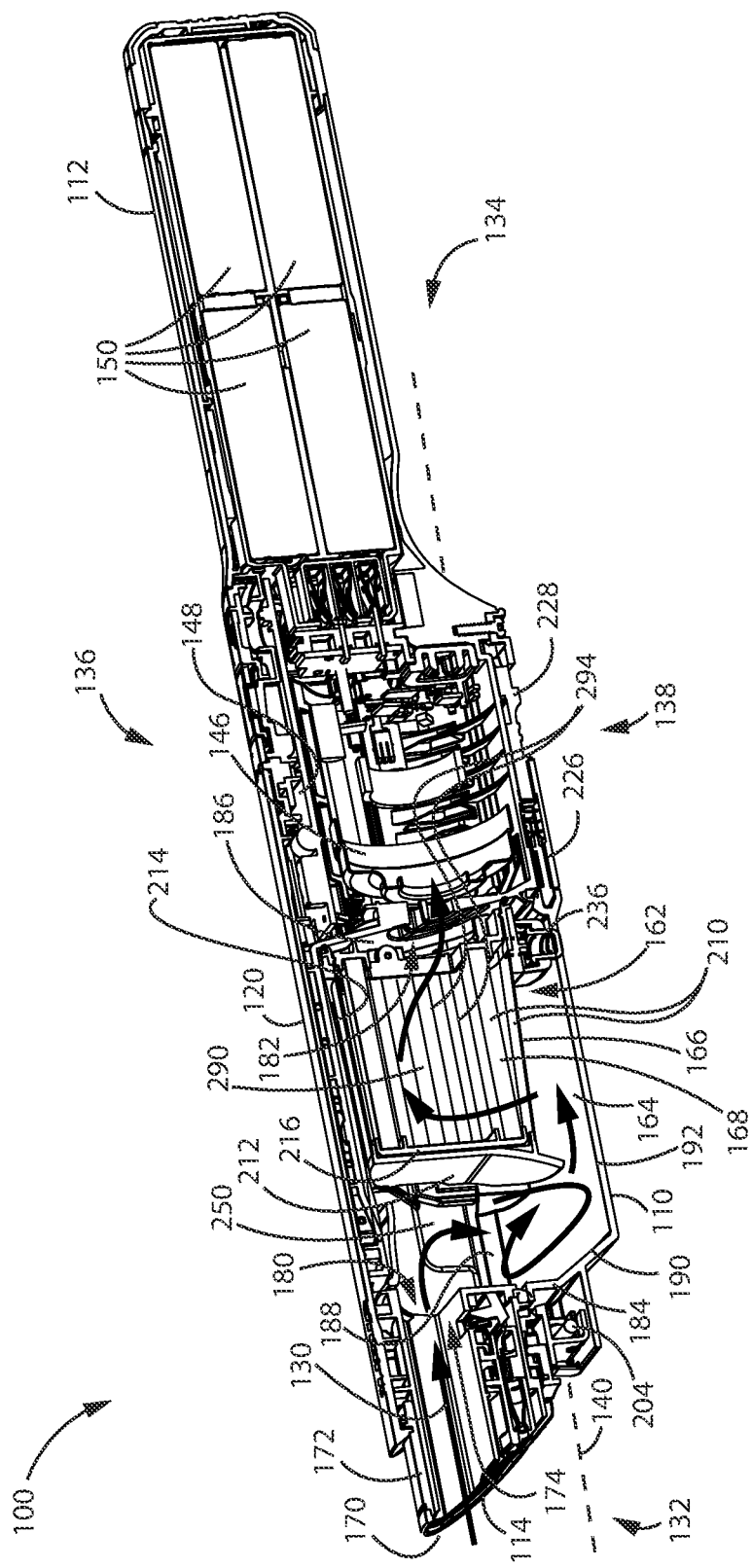
FIG. 2 is a cross sectional view of the surface cleaning apparatus of FIG. 1.

Referring to FIGS. 1 and 2, an exemplary embodiment of a surface cleaning apparatus is shown generally as 100. The following is a general discussion of the apparatus 100, which provides a basis for understanding several of the features that are discussed herein. Each of the features may be used individually or in any particular combination or sub-combination in embodiments of the apparatus 100.

Embodiments described herein include an improved air treatment member 110, an improved air treatment system, the surface cleaning apparatus 100 including the same, and the configuration of the surface cleaning apparatus 100. The surface cleaning apparatus 100 may be any type of cleaning apparatus, including for example a hand vacuum cleaner, a stick vacuum cleaner, a canister vacuum cleaner, and an upright vacuum cleaner.

In FIGS. 1 and 2, the surface cleaning apparatus 100 is illustrated as a hand vacuum cleaner, which may also be referred to as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, a handle 112 and a dirty air inlet 114 may be rigidly coupled to each other (directly or indirectly), such as being integrally formed or separately molded and then non-removably secured together such as by an adhesive or welding, so as to move as one while maintaining a constant orientation relative to each other. This is to be contrasted with canister and upright vacuum cleaners, whose weight is typically supported by a surface (e.g. a floor) during use. When a canister vacuum cleaner is operated or when an upright vacuum cleaner is operated in a 'lift-away' configuration, a second hand is typically required to direct the dirty air inlet at the end of a flexible hose.

Still referring to FIGS. 1 and 2, the surface cleaning apparatus 100 includes a main body 120 having the air treatment member 110 (which may be permanently affixed to the main body 120 or may be, or include portions that are, fully or partially removable therefrom for emptying), the dirty air inlet 114, a clean air outlet 124, and an air flow path 130 extending between the dirty air inlet 114 and the clean air outlet 124.

Surface cleaning apparatus 100 has a front end 132, a rear end 134, an upper end (also referred to as the top) 136, and a lower end (also referred to as the bottom) 138. In the embodiment shown, the dirty air inlet 114 is at an upper portion of the apparatus front end 132 and the clean air outlet 124 is at a lower portion of the apparatus rear end 134. It will be appreciated that dirty air inlet 114 and the clean air outlet 124 may be positioned in different locations of the apparatus 100. A longitudinal axis 140 of the apparatus 100 extends between the front and rear ends 132, 134.

The handle 112 of the surface cleaning apparatus 100 may extend rearwardly of the main housing 120, as shown. It will be appreciated that in other embodiments the handle 112 may be oriented in another manner (e.g., as a pistol grip extending forwardly and upwardly) and/or may be reconfigurable.

A suction motor 146 is provided to generate vacuum suction through the air flow path 130 and is positioned within a motor housing 148 (which may be part of the main body 120). The suction motor 146 may be a fan-motor assembly including an electric motor and impeller blade(s). While the suction motor 146 may be provided at any location in the air flow path 130, in the illustrated embodiment, the suction motor 146 is positioned in the air flow path 130 downstream of air treatment member 110. In this configuration, the suction motor 146 may be referred to as a "clean air motor". Alternatively, the suction motor 146 may be positioned upstream of the air treatment member 110 and referred to as a "dirty air motor".

In some embodiments, the surface cleaning apparatus 100 may include one or more (or all) of a power cable, energy storage member (e.g. battery or supercapacitor), cord reel, and an AC to DC power supply. These components may have various positional arrangements in different embodiments, which may improve the ergonomics of the surface cleaning apparatus (e.g. reduced weight, better weight balance, or greater portability).

In any of the embodiments disclosed herein, surface cleaning apparatus 100 may be configured as a cordless (e.g. battery powered) device, or a corded (e.g. mains powered) device, or both. In embodiments including a cordless configuration, such as shown in FIGS. 1 and 2, the suction motor 100 and an energy storage member 150 (e.g. one or more batteries or supercapacitors) may be positioned in any suitable location. For example, the suction motor 146 may be positioned forward of the handle 112 with the energy storage member 150 within the handle, as shown. This configuration may be compact and contribute to one or more reduced volume dimensions of the surface cleaning apparatus 100, e.g., a reduced length or height of the surface cleaning apparatus 100.

The air treatment member 110 is configured to remove particles of dirt and other debris from the air flow. In the illustrated example, the air treatment member 110 includes an air treatment chamber 160 having a porous dirt separator 162, and a dirt collection chamber 164 (also referred to as a "dirt collection region", "dirt collection bin", "dirt bin", or "dirt chamber"). In the illustrated example, the dirt collection chamber 164 is a region of the air treatment chamber 160 where separated dirt may accumulate until the dirt collection chamber 164 is emptied. Alternatively, or in addition, the air treatment member 110 may include a dirt collection chamber 164 that is external to the treatment chamber 160.

The porous dirt separator 162 may include a rigid porous member (e.g., a fine mesh screen and/or a plastic shroud having a plurality of openings therein) or a porous filter media (e.g. one or more of felt, foam, PTFE, HEPA media, low penetration, paper, paper-wax, cellulose, or other filter media), or a combination of one or more rigid porous members and one or more porous filter members. As described further elsewhere herein, the rigid porous member may be an outer and/or upstream member 166 and the porous filter member may be an inner (e.g., nested within the outer member 166) and/or downstream member 168, described further elsewhere herein. Optionally, outer member 166 may not be provided, in which case one or more nested porous filter media may be mounted in an outer holder 212. In such a case, the outer holder 212 may have a plurality of generally axially extending ribs defining a support or cage within which the porous filter media is removably receivable. The porous dirt separator 162 and the dirt chamber 164 may be of any configuration suitable for separating dirt from an air stream and collecting the separated dirt, respectively.

The hand vacuum cleaner 100 may include a post-motor filter (not shown) provided in the air flow path 130 downstream of suction motor 146 (e.g., in a post motor filter housing that may be part of main body 120). The post-motor filter may be formed from any suitable physical, porous filter media. For example, the post-motor filter may be one or more of a foam filter, felt filter, HEPA filter, or other physical filter media. In some embodiments, the post-motor filter may include an electrostatic filter, or the like. In other embodiments, as shown, the apparatus 100 may not have the post-motor filter or the post-motor filter housing.

As in the illustrated embodiment, the dirty air inlet 114 may be, or be at, an inlet end 170 of an air inlet conduit 172. Optionally, as exemplified, the inlet end 170 of the air inlet conduit 172 can be used as a nozzle to directly clean a surface. Alternatively, or in addition to functioning as a nozzle, the air inlet conduit 172 may be connected (e.g. directly connected) to the downstream end of any suitable accessory tool such as a rigid air flow conduit (e.g., an above floor cleaning wand), a crevice tool, a mini brush, and the like. As shown, the dirty air inlet 114 may extend forward of the air treatment member 110 and/or the air treatment chamber 160 and/or the porous dirt separator 162, although this need not be the case.

The air treatment chamber 160 having the porous dirt separator 162 is located in the air flow path 130 between a treatment chamber air inlet 180 and a treatment chamber air outlet 182. The air treatment chamber 160 has a front end 184, a rear end 186, a pair of laterally opposed sidewalls 188 extend longitudinally between the front and rear ends 184, 186, and front and bottom walls 190, 192 which extend laterally and connect the left and right sidewalls 188.

As exemplified, the porous dirt separator 162 may define the location at which air exits the volume of the treatment chamber 160. Air exits the volume of the treatment chamber 160 through treatment chamber air outlet 182 and may be subjected to physical filtration by passing through the porous dirt separator 162 prior to exiting through the outlet 182.

As exemplified, the treatment chamber air inlet 180 may be at an opposite end of the air treatment chamber 160 from the treatment chamber air outlet 182. The treatment chamber air inlet 180 may be located at the downstream end 174 of the air inlet conduit 172 and forward of the porous dirt separator 162. As exemplified, the treatment chamber air inlet 180 may be at an upper end of the air treatment chamber 160 and has an inlet conduit axis that is generally parallel to axis 140. Accordingly, as exemplified, air may travel downwardly into the air treatment chamber 160 and then rearwardly to the porous dirt separator 162. Accordingly, as air enters the air treatment chamber 160, heavier dirt particles may fall downwardly to dirt collection chamber 164. In other embodiments, the treatment chamber air inlet 180 and outlet 182 may be positioned at different locations.

In operation, when the suction motor 146 is activated, dirty air enters the apparatus 100 through the dirty air inlet 114 and is directed along the air inlet conduit 172 to the air treatment chamber air inlet 180. Dirt particles and other debris (hereafter "dirt") may be separated from the dirty air flow as the dirty air flows through the air treatment chamber 160 and as air passes through the porous dirt separator 162 before exiting the treatment chamber air outlet 182. At least some of the separated dirt may collect within the dirt chamber 164 until the dirt chamber 164 is emptied. For example, if the air treatment chamber 160 is primarily a momentum separator, as exemplified, then some (e.g., the heavier) dirt may be separated from the inflow air stream by gravity due to the air flow rate decreasing as it enters the air treatment chamber 160 and/or a change in the direction of the air flow as it enters or travels through the air treatment chamber 160, as disclosed further subsequently. Additional dirt may be separated by the porous dirt separator 162 due to filtration.

From the air treatment chamber air outlet 182, the air flow may be directed into the motor housing 148, drawn into the suction motor 146 and then discharged from the apparatus 100 through the clean air outlet 124.

Wipers

The air treatment member 110 may include one or more wipers 198 (e.g., rigid wipers, such as hard plastic or metal scrapers or stiff brushes, or flexible wipers, such as silicone spatula or soft bristled brush, or include both rigid and flexible elements). The air treatment chamber 160 may be openable, and the wipers 198 may be configured to travel across an upstream surface 200 (see also FIG. 6) of the porous dirt separator 162 as the air treatment chamber 160 is opened.

Figure 3:
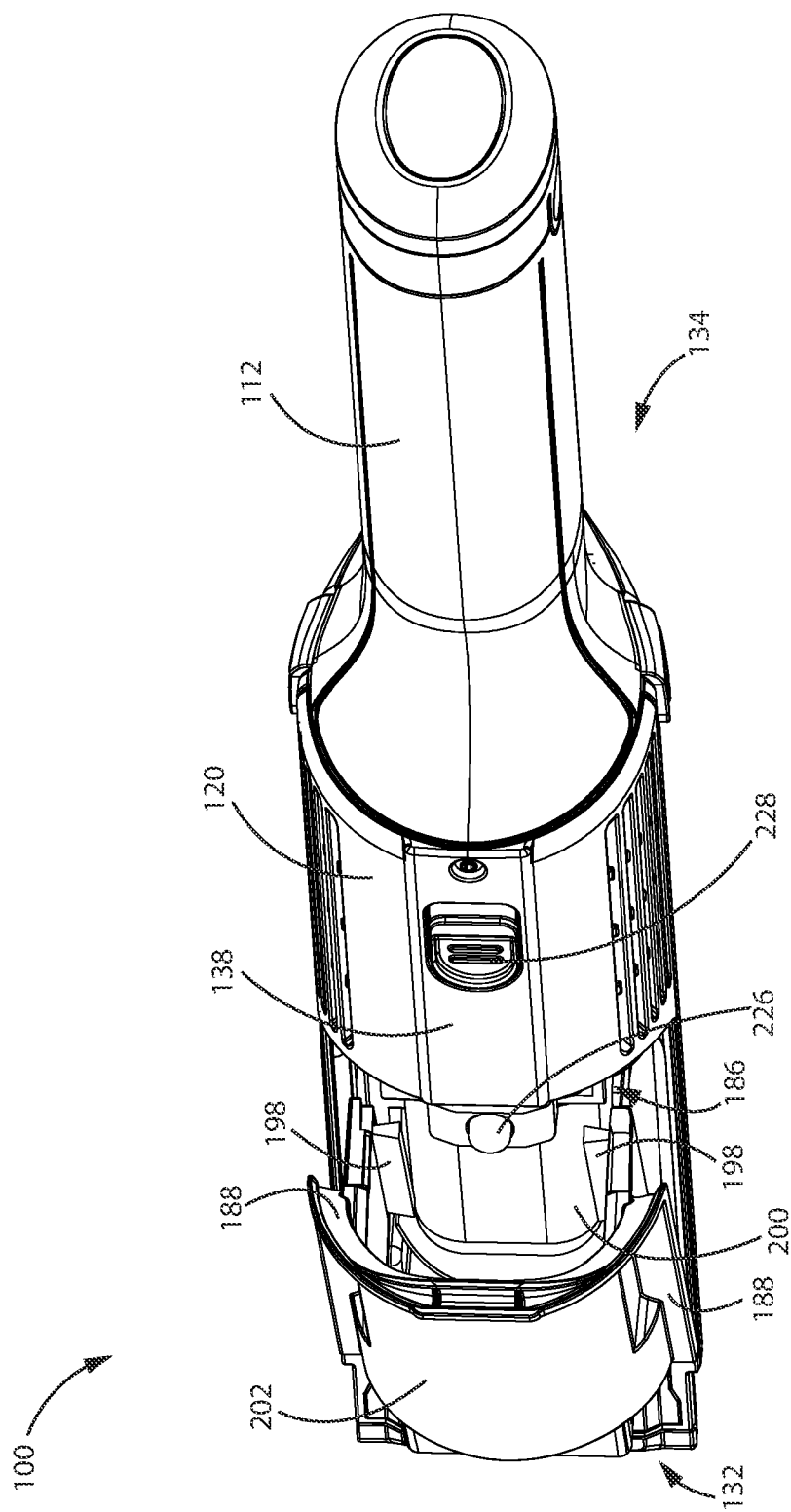
FIG. 3 is a rear bottom perspective view of the surface cleaning apparatus of FIG. 1 with a door partially opened.

As exemplified in FIG. 3, the chamber 160 may be opened by opening a door, a sidewall or other portion of the walls defining the air treatment chamber 160. As exemplified, the chamber 160 may be opened by opening door 202 from the closed position (FIG. 2) to the open position (FIG. 3). The door 202 may be held closed by a latch 226 (FIG. 2) that may be withdrawn by drawing an exteriorly exposed rearward portion 228 rearward. The door 202 may be biased open, e.g., by a spring-loaded projection 236 pressing against an interior surface. The wiper 198 may be drivingly connected (e.g., rigidly connected) to a portion of the chamber 160 that moves relative to the dirt separator 162 as the chamber 160 opens so as to be itself moved relative the dirt separator 162.

For example, the wiper 198 may brush, slide, or scape the porous dirt separator 162 (i.e., some or all of the upstream surface 200) as the treatment chamber 160 is opened. The separator upstream surface 200 may be a lubricious surface (e.g., formed of Teflon™ or coated with Teflon™) to make cleaning easier (i.e., easier than running the wipers over metal). The wiper(s) may remove dirt from surfaces of the porous dirt separator 162, whereby the filtration capacity of the porous dirt separator 162 may be improved or restored (i.e., reducing back pressure). Since the dirt separator 162 is in the chamber 160, dirt removed from the porous dirt separator by the wiper 198 may collect in the dirt collection region 164 of the treatment chamber 160 that is being opened or may exit the treatment chamber 160 with the dirt collected in the dirt collection region 164. Wipers may allow the user to clean the porous dirt separator 162 simultaneously as the user opens the treatment chamber 160 for emptying. It will be appreciated that if the upstream member 166 is a holder for the filter media 168, then the wipers may be configured to travel across an upstream surface of the filter media 168 as the air treatment chamber 160 is opened.

As in the embodiment of FIG. 3, the wipers 198 may be configured such that the wipers 198 are positioned proximate the chamber rear end 186 and/or an upper end of the chamber 160. This may reduce interference with air flow in the treatment chamber 160. As exemplified in FIG. 3, the wipers 198 may extend from each of the chamber sidewalls 188 laterally inwardly towards porous dirt separator 162 to make wiping contact with upstream surface 200 (i.e., at least part of the surface 200) on the left and right sides of porous dirt separator 162 during at least a portion of the opening stroke (i.e. opening movement) of the treatment chamber 160.

The treatment chamber 160 may be openable in any manner that allows the wipers 198 to wipe some or all of the upstream surface 200 as treatment chamber 160 is opened, or in response to opening treatment chamber 160. As exemplified in FIG. 3, the air treatment chamber 160 includes a moveable portion (which comprises a portion of the side walls 188 and bottom wall 192), e.g., door 202, that can move between the open and closed positions and a stationary portion (which comprises a top wall 194 and a portion of the side walls of the air treatment chamber 160 on which porous dirt separator 162 may be mounted). Accordingly, the moveable portion surrounds at least a portion of the porous dirt separator 162. The moveable portion may be rotatably (e.g., pivotally) openable by, e.g., a hinge 204 (FIG. 2). Hinge 204 may rotatably join, e.g., a front end of door 202 or a lower front end of door 202 to main body 120. As the moveable portion is opened, wipers 198 travel in an arcuate path across upstream surface 200, which is attached to the stationary portion.

Figure 6:
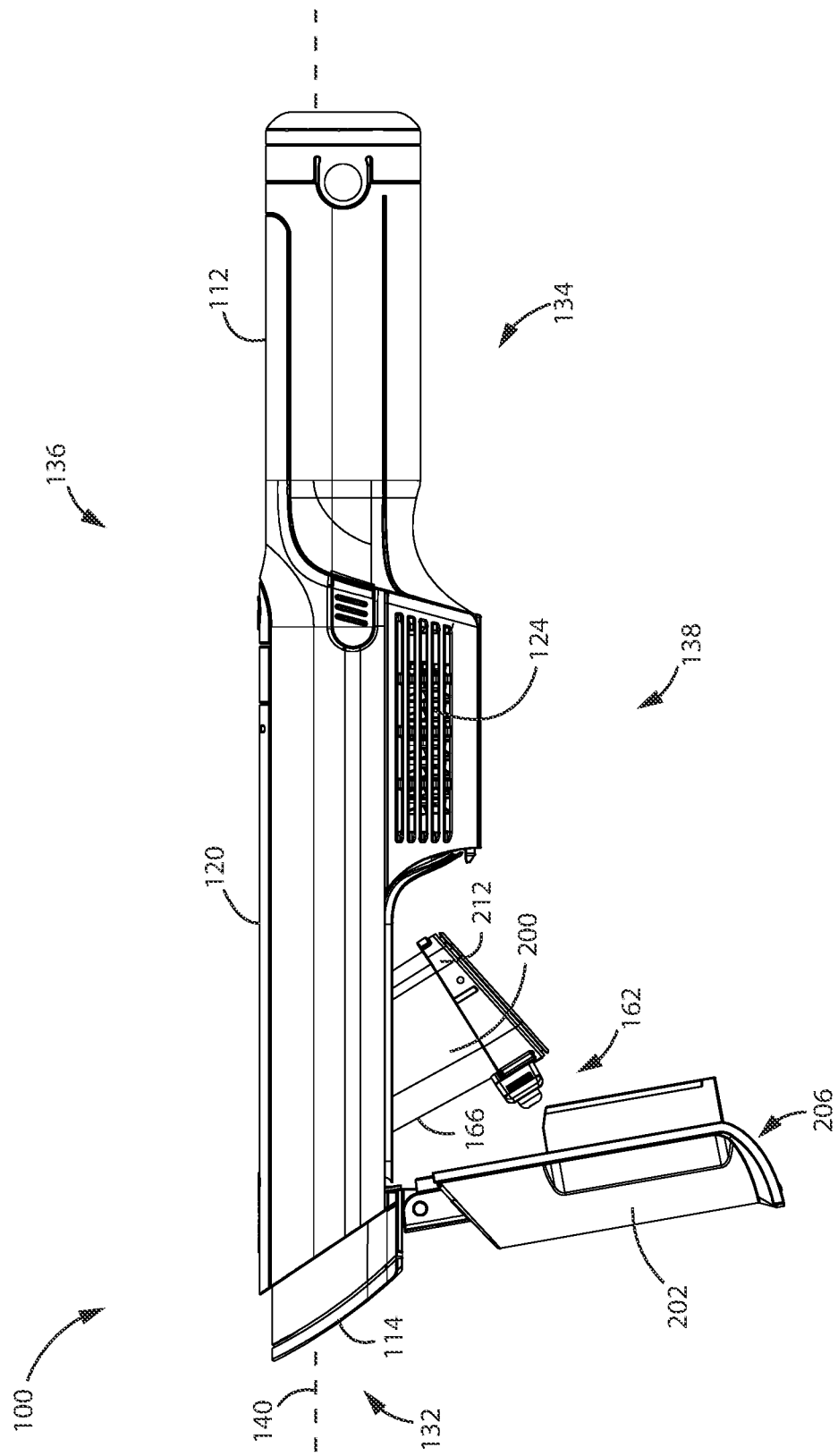
FIG. 6 is a side view of the surface cleaning apparatus of FIG. 1 with the door open.

In some embodiments, as exemplified in FIG. 3, the openable portion of treatment chamber 160 may have an open upper end 206 (FIG. 6). When treatment chamber 160 is opened (e.g., door 202 is pivoted forwardly), the open upper end 206 may face rearwardly and/or downwardly whereby dirt collected in treatment chamber 160 can be poured out through the open end 206.

Multiple Perforated and Nested Substrates

While the porous dirt separator 162 may comprise one porous filter member, optionally, the porous dirt separator comprises two or more sequential porous filter members, such as perforated substrates, such as screens or shrouds, and/or physical filter media, which use physical separation (a physical separation media) to separate dirt from air flow that passes through the porous filter member(s). The sequential perforated substrates and/or filter media may be nested. The upstream porous filtering member(s) may be coarse for capturing larger dirt particles, and downstream porous separating member(s) may be fine for capturing smaller dirt particles. This arrangement of coarse and fine porous filtering members may provide greater particle separation efficiency as compared with using a single porous filtering member tasked with capturing dirt particles of all sizes. The porous dirt separator 162 may be removable form the main body 120, and the substrates and/or filter media may be separable from one another (e.g., for cleaning or replacement).

FIG. 2 exemplifies a porous dirt separator 162 that includes two porous separating members 210 positioned in the air flow path in series, although more than two may be included in some embodiments. As indicated elsewhere herein, the porous dirt separator 162 may include the outer perforated substrate (outer porous separating member 166) and an inner filter (inner porous separating member 168). In the downstream direction, each porous separating member 210 may be configured to filter progressively finer dirt than the immediately upstream porous separating member 210. This design may mitigate the smaller pores of the fine inner porous separating member 168 being clogged prematurely by large dirt particles.

In one example, outer porous separating member 166 is a coarse screen and the inner porous separating member 168 is a filter. For example, outer screen 166 may have a coarse hole diameter of 0.015-0.125 inches, or more preferably 0.040 to 0.080 inches; and the inner filter 168 may have a fine pore diameter of 0.01 to 1 micron, or more preferably 0.01 to 0.1 microns.

The surface cleaning apparatus 100 may include an additional pre-motor filter (not shown) positioned in the air flow path 130 between the air treatment member 110 and the suction motor 146. The pre-motor filter may be nested withing the inner porous separating member 168 and may be configured to (e.g. have a pore size to) separate finer dirt from the air flow than air treatment member 110 and/or porous dirt separator 162.

As exemplified in FIGS. 2 to 8, the porous dirt separator 162 may be moveably mounted with respect to a portion of the air treatment chamber such that at least one filter member of the porous dirt separator 162 may be removed for cleaning or replacement. Optionally, the porous dirt separator 162 e.g., outer holder 212, is releasably mounted to an inner surface 214 of the air treatment chamber 160. Optionally, the inner and outer porous separating members 166, 168 may each be held by separable holders or frameworks of the porous dirt separator 162.

The porous dirt separator 162 may, as exemplified in FIG. 2, include an outer holder 212 secured to the inner surface 214 of the air treatment chamber 160 (i.e., an inner surface of the top wall 194) and configured in an operating position to hold, e.g., the outer member 166 in the air flow path 130. The porous dirt separator 162 may also, as illustrated, include an inner holder 216 nested within the outer member 166 and configured in the operating position to hold the inner member 168 in the air flow path 130. If an outer member 160 is not provided, then the outer holder 212 may receive the inner member 168.

Figure 4:
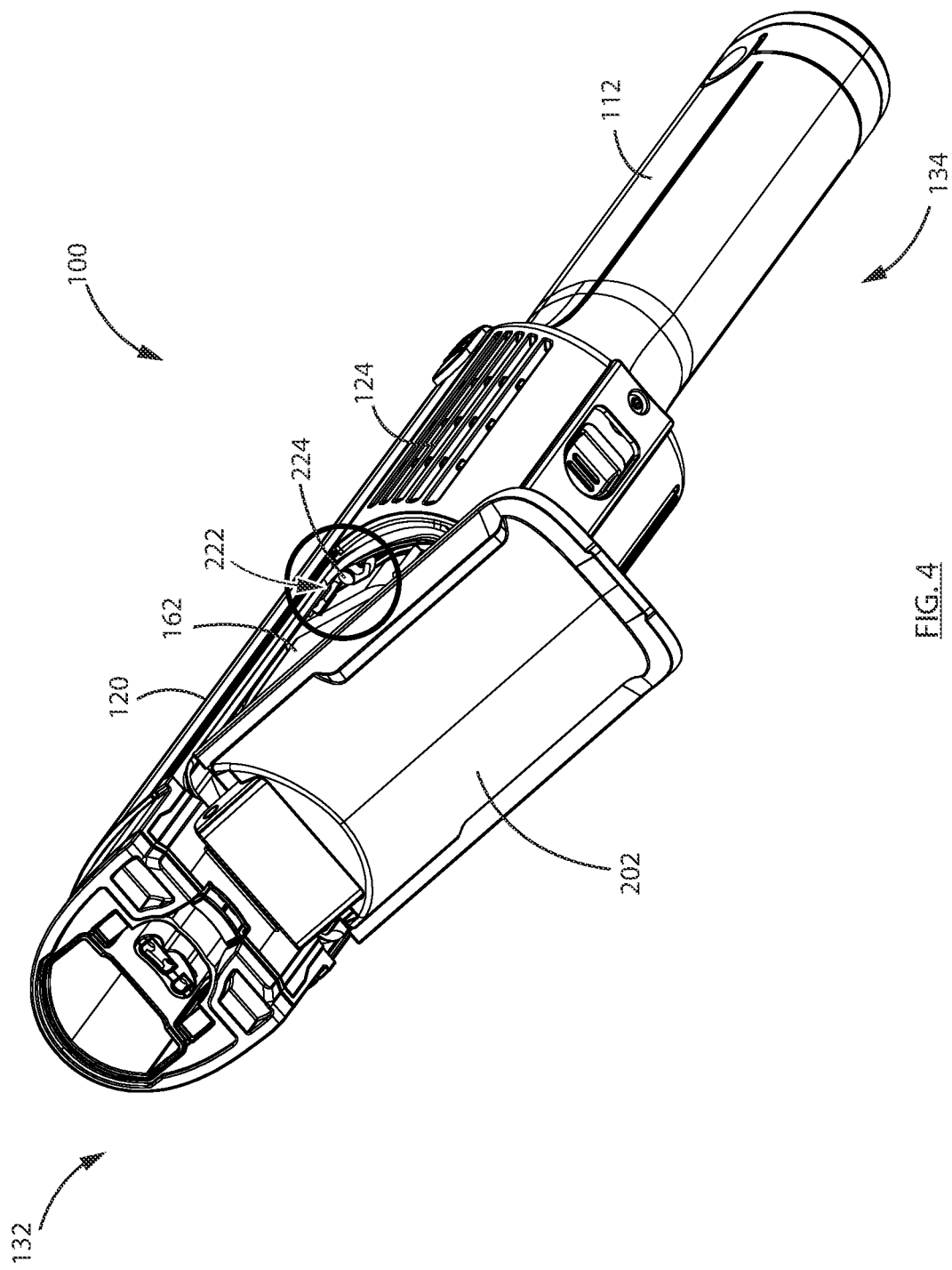
FIG. 4 is a front bottom perspective view of the surface cleaning apparatus of FIG. 1 with the door partially opened.
Figure 5:
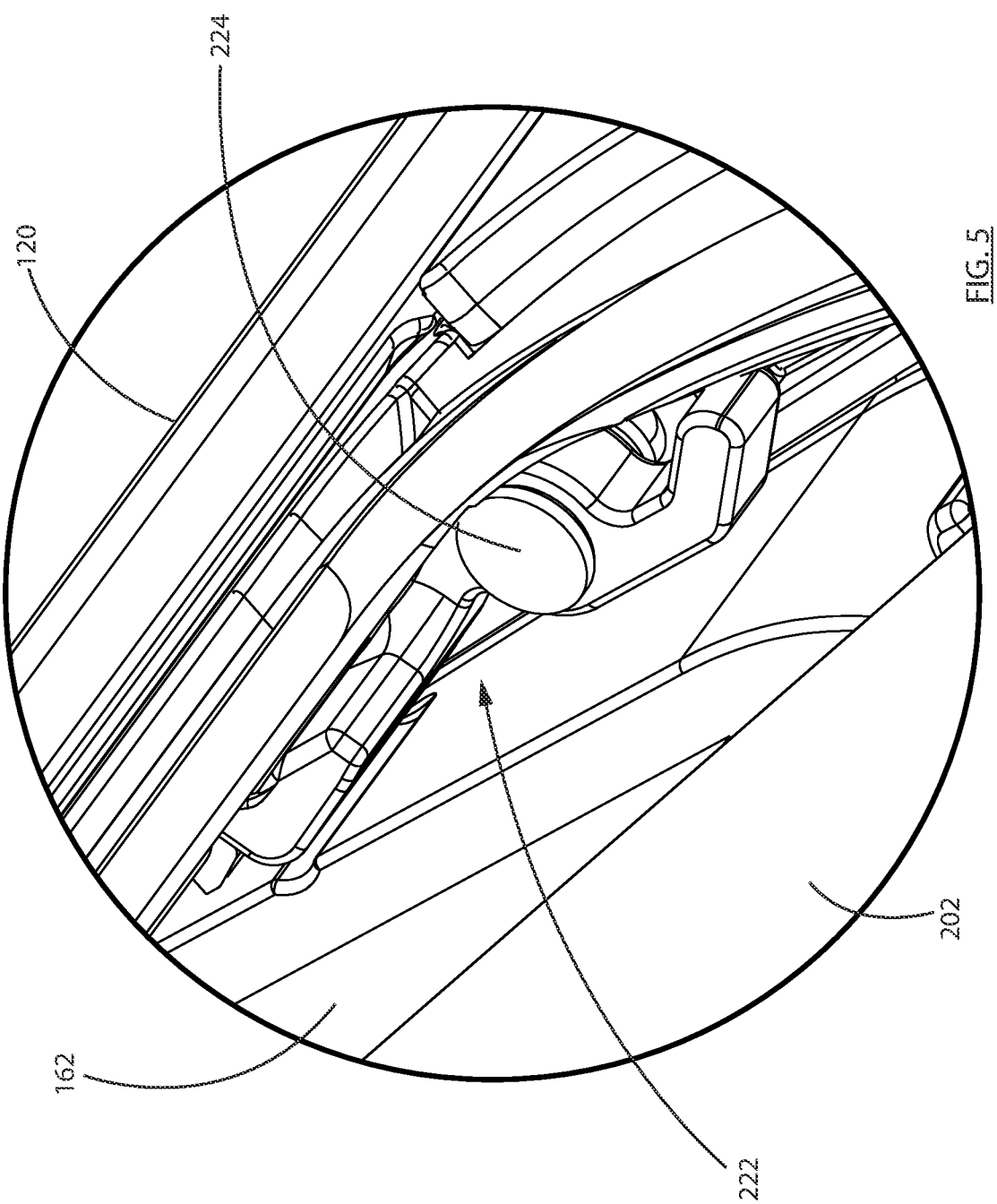
FIG. 5 is an expanded view of a portion of FIG. 4.

As exemplified in FIGS. 4 to 8, the outer holder 212 may be joined to the inner surface 214 of the air treatment chamber 160 by a pivot connection or hinge 220 (see FIGS. 7 and 9) and optionally at least one further connection 222 spaced apart from the pivot connection (see FIGS. 4 and 5). The at least one further connection 222 may be a releasable connection such that the porous dirt separator 162 may be pivoted about the pivot connection 220 when the further connection 222 is released and prevented from pivoting otherwise. For example, when the treatment chamber 160 is open, the porous dirt separator 162 may be moveable relative the main body 120 to free or partially free the porous dirt separator 162 from the main body 120. As exemplified in FIGS. 4 and 5, the further connection 222 may be a friction fit connection, such as a sprung arm and detent 224 of the inner surface 214 that a user may release by pulling on the porous dirt separator 162 (e.g., tugging on a lower portion of a rearward end of the separator 162 to move the separator 162 to the position of FIG. 6).

Figure 9:
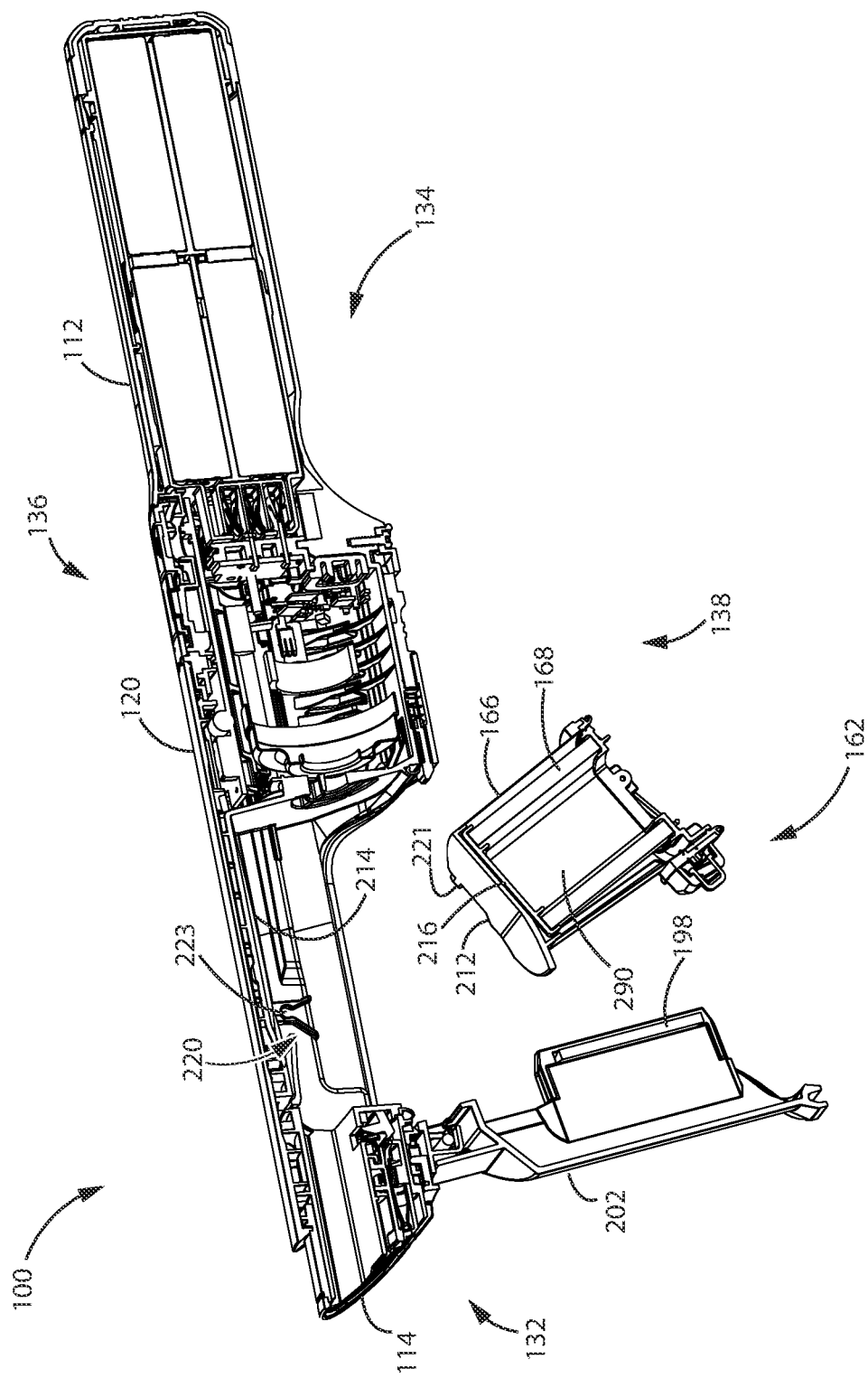
FIG. 9 is a cross sectional view of the surface cleaning apparatus of FIG. 1 with the door open and a porous dirt separator removed.
Figure 10:
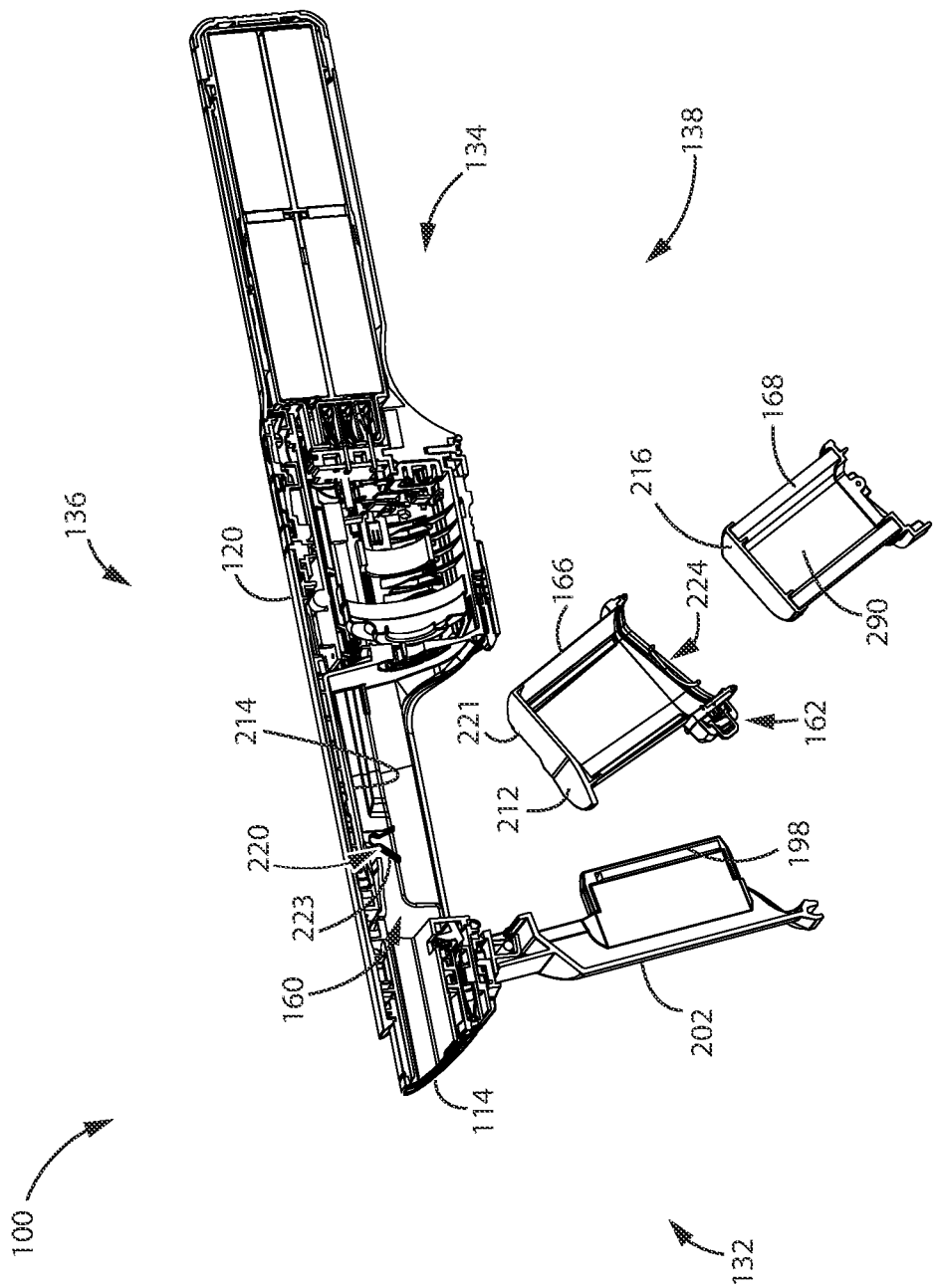
FIG. 10 is a cross sectional view of the surface cleaning apparatus of FIG. 1 with the door open and the porous dirt separator removed, and the porous filter member removed from the porous dirt separator.

Optionally, as exemplified in FIGS. 9 and 10, the pivot connection 220 may also be released such that the porous dirt separator 162 may be fully released (removed) from the main body 120. For example, a pin 221 (e.g., on separator 162) may be removable from a socket 223 (e.g., in inner surface 214).

Figure 7:
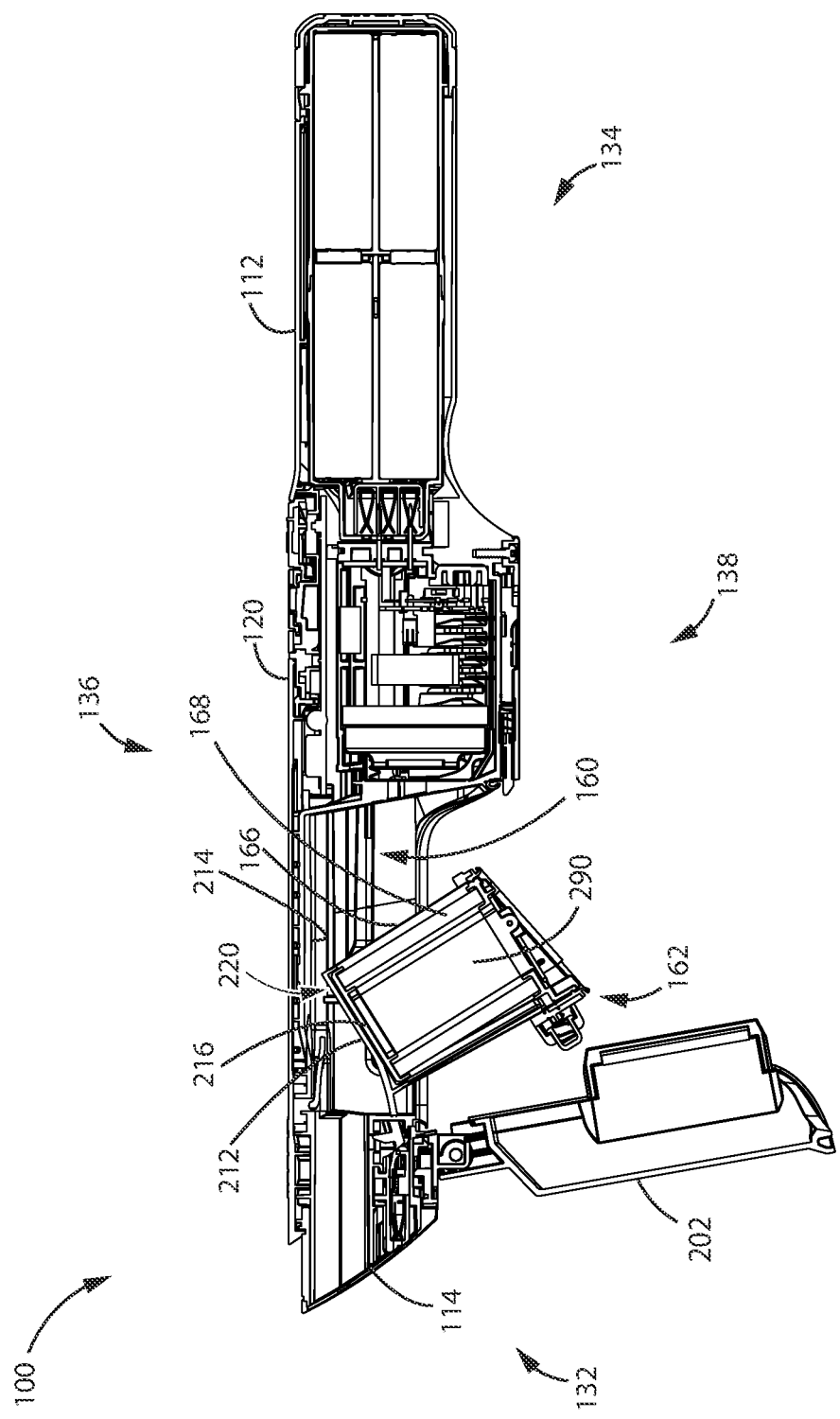
FIG. 7 is a cross sectional view of the surface cleaning apparatus of FIG. 1 with the door open.
Figure 8:
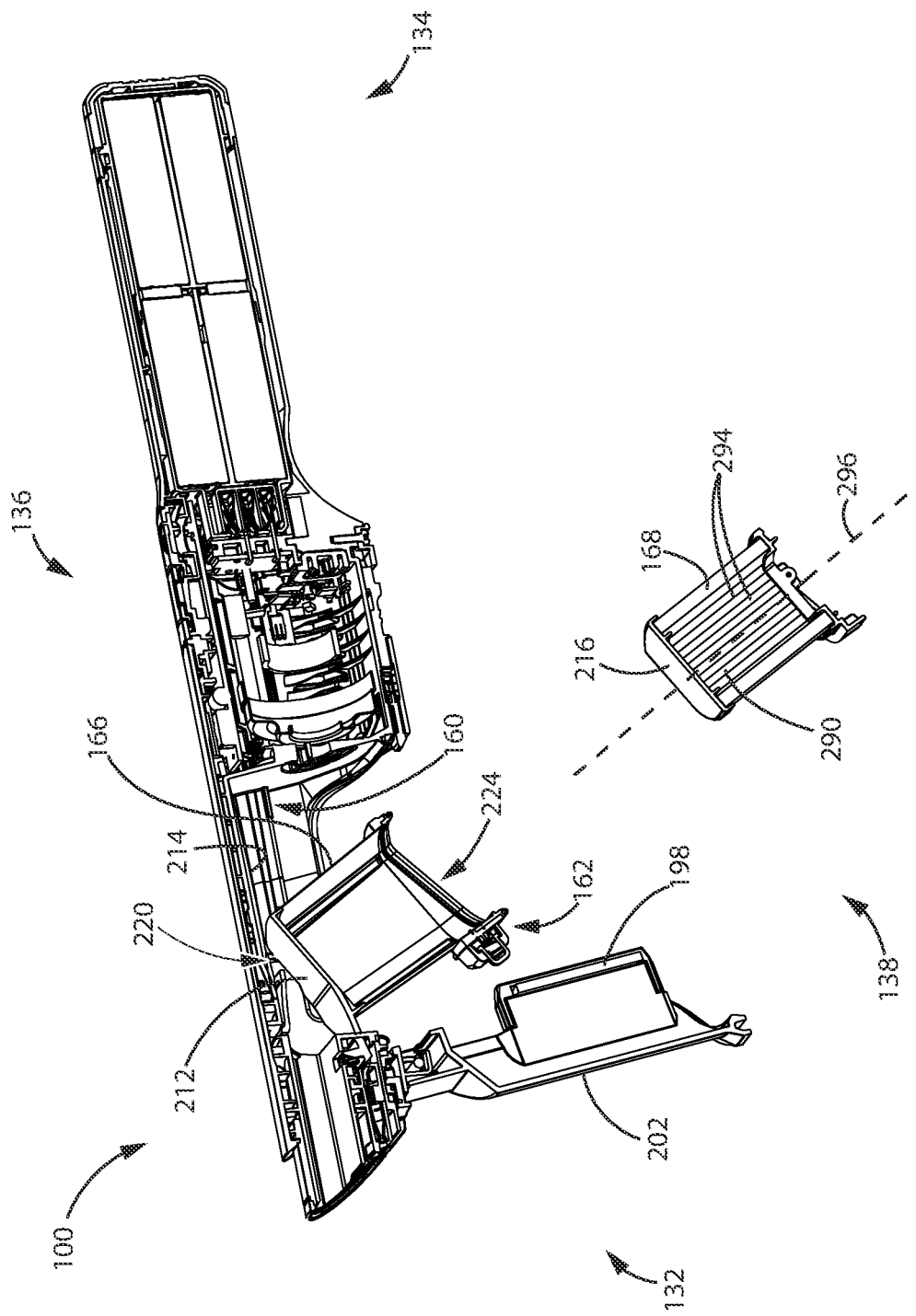
FIG. 8 is a cross sectional view of the surface cleaning apparatus of FIG. 1 with the door open and a porous filter member removed.

As exemplified in FIGS. 8 and 10, the inner porous separating member 168 may be removably nested within the outer porous separating member 166. This may provide user access to inspect, clean, repair, or replace the inner porous separating member 168. Inner porous separating member 168 may be removed from outer porous separating member 166 in any manner that moves at least a portion of the outer porous separating member 166 relative to the inner porous separating member 168. For example, inner porous separating member 168 may be translatably removed from an open end 224 of outer porous separating member 166, as exemplified in FIGS. 7 and 8.

As in the exemplary embodiment of FIGS. 6 to 8, the porous dirt separator 162 may be pivoted about the pivot connection 220 to a position in which the inner porous member 168 may be removed from the outer porous member 166 (e.g., as shown in FIG. 8). In some embodiments, as exemplified in FIGS. 9 and 10, the inner porous member 168 may be removed from the outer porous member after the porous dirt separator 162 is removed from the inner surface 214.

Optionally, if an outer porous separating member 166 is not provided, then outer holder 212 then the inner porous separating member 168 may be slidably removeable from within the outer holder 212.

It will be appreciated that wipers 198 may also be used to clean one or more nested porous separating members (e.g., wipers affixed to outer member 166 and arranged to wipe inner member 168 when the two are separated).

Impact Wall and Circular Flow

In accordance with this aspect, the surface cleaning apparatus 100 includes a member to change the direction of air flow as the air flow enters the air treatment chamber 160 (e.g., an impact wall 230 to change the direction of air flow in the air treatment chamber 160). In other words, the air treatment chamber includes a member that air impacts upon entering the air treatment chamber. The surface cleaning apparatus 100 includes the impact member (e.g., impact wall 230) in combination with at least one wall portion arranged to impart a recirculating or generally circular flow (herein referred to as a circular flow for convenience) in the air treatment chamber 160.

The circular flow may assist in gathering large debris, e.g., hair and other fibers, prior to the large debris reaching the porous dirt separator. Accordingly, some of the large debris may be prevented from reaching the porous dirt separator 162, which may increase the performance of the porous dirt separator. In some embodiments, a collection of fibers may form a clump in the location spaced from the porous dirt separator, and the clump may further filter air prior to the air reaching the porous dirt separator 162.

The circular flow may be combined with the impact wall 230. The air treatment chamber 160 may be primarily a momentum separator in which dirt is separated from the inflow air stream by gravity due to the air flow rate decreasing as it enters the air treatment chamber and/or a change in the direction of the air flow as it enters the air treatment chamber 160. In other words, in some embodiments, the air treatment member does not include a cyclone.

The impact wall 230 may be arranged downstream of the chamber air inlet 180 to the air treatment chamber 160. The impact wall 230 may be opposed to the inlet 180. Accordingly, the impact wall 230 may be arranged such that air entering the air treatment chamber 160 impacts the impact wall 230 (i.e., is deflected by the impact wall 230), rather than being directed along the impact wall (i.e., air is deflected by the impact wall 230 rather than being guided along a wall as by the wall of a cyclone). In some embodiments, a chamber 160 with an impact wall 230 may facilitate a more compact and/or efficient or effective apparatus 100 (e.g., more compact than a cyclone). This aspect may be used by itself or in combination with one or more of the other aspects set out herein.

As exemplified in FIGS. 11 and 12, the inlet conduit 172 may be generally linear and have an axis 234. The axis 234 may be a longitudinal axis extending between the air inlet end 170 and the downstream end 174 and may be generally parallel to axis 140.

The impact wall 230 may include a generally planar portion 232, and the generally planar portion 232 may be arranged generally perpendicular to an axis 234 of the inlet conduit 172 and may be opposite (face) the downstream end 174 of the conduit 172. However, it will be appreciated that in other embodiments the impact wall 230 may be non-planar and/or arranged at an angle to a plane that is perpendicular to the axis 234 of the inlet conduit 172. For example, the impact wall 230 may include one or more planar portions extending downwardly and forwardly, without any planar portions perpendicular to the axis of the inlet conduit.

The impact wall 230 is an air impermeable wall. In the illustrated embodiment, the air impermeable impact wall 230 is opposite the downstream end 174 of the air inlet conduit 172 and arranged to be impacted by air travelling out from the inlet conduit 172 into the air treatment chamber 160.

As exemplified in FIGS. 11 and 12, the impact wall 230 has a lower end 240 which is spaced from the lower end 242 of the air treatment chamber 160. At least some of the air travels rearwardly between the lower end 240 of the impact wall 230 and the lower end 242 of the air treatment chamber 160 to the porous filter member 162. In some embodiments, at least 50%, at least 60%, at least 75% or at least 90% of the air travels rearwardly between the lower end 240 of the impact wall 230 and the lower end 242 of the air treatment chamber 160 to the porous filter member 162. In such a case, the remainder of the air may travel around the lateral sides of the impact wall 230 to the porous dirt separator 162.

In other embodiments, the lateral sides of the impact wall 230 may extend to the side wall of the air treatment chamber whereby all of the air travels rearwardly between the lower end 240 of the impact wall 230 and the lower end 242 of the air treatment chamber 160 to the porous filter member 162. In such an embodiment, a gap 252 between the lower end 240 of the impact wall 230 and the lower end 242 of the air treatment chamber 160 may define a sole passage from the treatment volume 250 to the porous filter member 162.

In some embodiments, a treatment volume 250 of the air treatment chamber 160 is positioned between the front end 184 of the air treatment chamber 160 and the impact wall 230 and/or a projection of the impact wall 230 to the lower end 242 of the chamber 160. Treatment of air within the air treatment chamber 160 may primarily take place in either or both of the treatment volume 250 and at the porous dirt separator 162.

One or more portion(s) of the impact wall 230 and/or one or more deflecting portion(s) of a wall defining part of the front end 184 of the air treatment member 160 imparts a circular flow to air entering the air treatment chamber 160.

As exemplified in FIGS. 11 and 12, the front end 184 of the air treatment chamber 160 includes the front wall 190. The deflecting portion may include a lower angled wall portion 260 of the front wall 190. The lower angled wall portion 260 has an upper end 262 that is positioned forward of a lower end 264 of the lower angled wall portion 260. In some embodiments, a longitudinal axis 266 of the air treatment chamber 160 extends between the chamber front end 184 and the chamber rear end 186. The longitudinal axis 266 of the air treatment chamber 160 may be generally parallel to the axis 234 of the inlet conduit 172. The lower angled wall portion 260 may be planar and may extend upwardly and forwardly at an angle of, e.g., 10° to 80°, 20° to 70°, or 30° to 60° from a plane that is transverse to the longitudinal axis 266 of the air treatment chamber 160.

The deflecting portion may also, or alternatively, include a directing member 270 associated with an outlet port 272 at the downstream end 174 of the inlet conduit 172. The directing member 270 may, in operation as exemplified in FIG. 12, be in an operation position in which the directing member 270 extends axially inwardly and downwardly at an angle to the longitudinal axis 266 of the air treatment chamber 160, and is positioned to be impacted by air travelling through the inlet conduit 172. In the operating position, the directing member 270 may be at an angle of at least, e.g., 5°, at least 10°, or at least 15° from the longitudinal axis 266 (i.e., from a position that is parallel to the longitudinal axis).

The directing member 270 may include or be an openable door 274 provided at the outlet port 272 of the inlet conduit 172, and the openable door 274 may be moveable between a closed position (as exemplified in FIG. 11) in which the moveable door 274 closes the downstream end 174 of the inlet conduit 172 (i.e., closes the inlet 180 of the chamber 160) and the operating position (as exemplified in FIG. 12) in which the openable door 274 extends generally axially inwardly.

The openable door 274 can close the inlet 180 of the air treatment chamber 160. If the dirt collection chamber 164 is in the air treatment chamber 160, the door 274 may inhibit movement of collected dirt from falling out out of the treatment chamber 160 through the inlet 180. The door 274 may be biased in a closed position closing the inlet 180. In some embodiments, the door 274 is biased in the closed position and may be drawn open by negative pressure on the downstream side due to the operations of the suction motor 146.

The openable door 274 may include a planar portion that is generally transvers to the longitudinal axis 266 in the closed position and that is prevented from moving past a maximum open extent, e.g., a position between, e.g., 1° and 10°, between 3° and 7°, or about 5° from a position parallel to the longitudinal axis 274, in an operating position. Accordingly, and as a result of the angled position, the planar portion of the openable door may extend downwards to be impacted by air entering the air treatment chamber, and thereby impart the circular flow.

Alternatively, or additionally, a portion 280 of the impact wall 230 that extends downwardly and forwardly at an angle to a plane that is transverse to the longitudinal axis 266 may impart the circular flow to air entering the air treatment chamber 160. As exemplified in FIGS. 11 and 12, the portion 280 of the impact wall 230 may extend downwardly and forwardly at an angle of, e.g., 5° to 25° to the plane that is transverse to the longitudinal axis 266. The portion 280 of the impact wall 230 may comprise a lower lip portion 282 of the impact wall 230. The portion 280 of the impact wall 230, as exemplified, may extend below a lower end 284 of the porous dirt separator 162 and/or the porous filter member 168. For example, as illustrated, the lower lip portion 282 may extend below the lower end 284 of the porous filter member 168.

As exemplified in FIGS. 11 and 12, the surface cleaning apparatus 100 may include the lower angled wall portion 260, the directing member 270, and the lower angled portion 280 of the impact wall 230.

In other embodiments, the surface cleaning apparatus may include any one or two of the lower angled wall portion 260, the directing member 270, and the lower angled portion 280 of the impact wall 230. For example, as exemplified in FIGS. 13 and 14, the surface cleaning apparatus 100 may include the directing member 270 and the lower angled portion 280 of the impact wall 230, without the lower angled wall portion 260.

Figure 15:
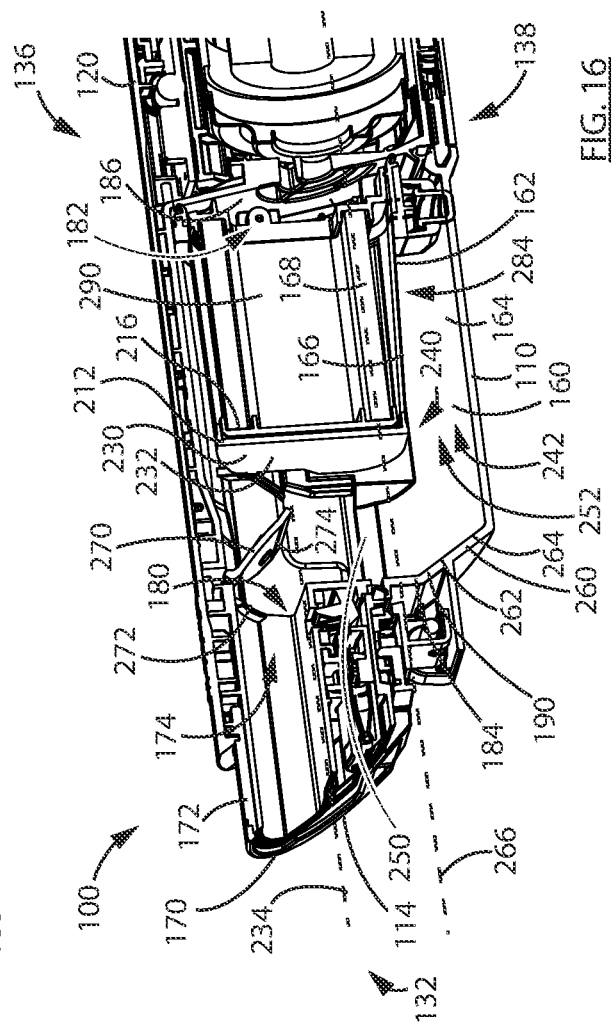
FIG. 15 is a cross sectional view of a forward portion of a surface cleaning apparatus according to a further embodiment.
Figure 16:
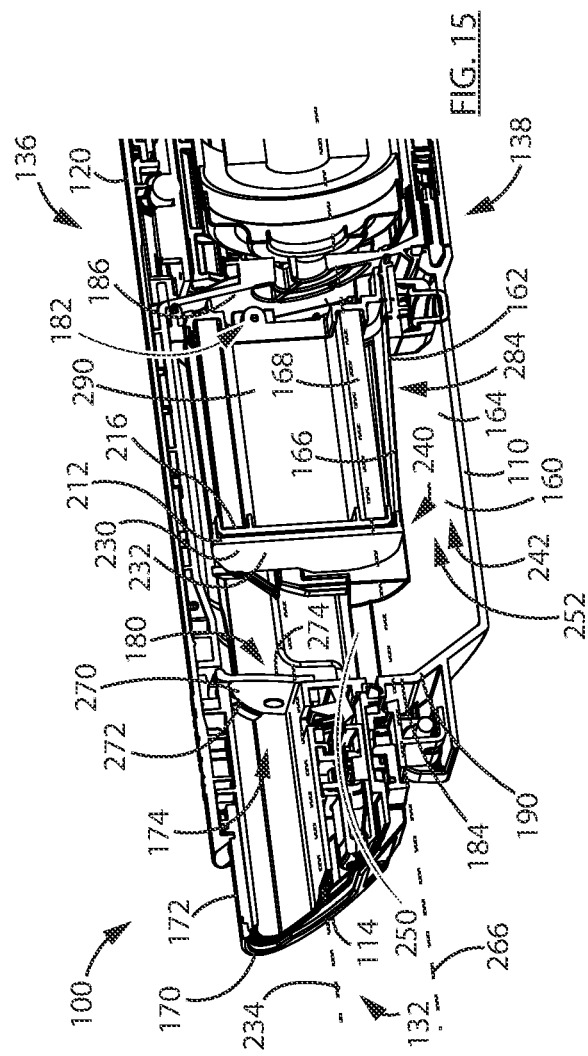
FIG. 16 is a cross sectional view of the surface cleaning apparatus of FIG. 15 with a directing member opened.

In another example, as exemplified in FIGS. 15 and 16, the surface cleaning apparatus 100 may include the directing member 270 and the lower angled wall portion 260, without the lower angled portion 280 of the impact wall 230.

In another example, as exemplified in FIGS. 17 and 18, the surface cleaning apparatus 100 may include the directing member 270, without the lower angled wall portion 260 or the lower angled portion 280 of the impact wall 230.

In another embodiment, as discussed subsequently, the openable door 274 may be fully openable (e.g., the maximum open extent may be parallel or generally parallel to the longitudinal axis 274), in which case, the openable door may not act as a directing member 270.

Fully Openable Chamber Inlet Door

In accordance with this aspect, the openable door 274 of the surface cleaning apparatus 100 has an operating position in which the openable door is moved (e.g., lifted) out of the way of air entering the air treatment chamber. Lifting the openable door 274 out of the way may reduce back pressure and increase the air flow rate of air through the apparatus. This aspect may be used by itself or in combination with one or more of the other aspects set out herein.

As exemplified in FIG. 2, the openable door 274 may be a flap door pivotally coupled to the main body 120 at a top end of the openable door 274. The openable door 274 may be moved out of the way by being pivoted from the closed position closing the inlet 180 of the chamber 160 (e.g., FIG. 11) to an open position in which it is not impacted or substantially impacted by air entering the air treatment chamber 160 (i.e., a position in which it does not impart or substantially impart the circular flow, as exemplified in FIG. 2). As exemplified in FIG. 2, this may be a position in which the door 274 is not angled towards the longitudinal axis 274 by more than, e.g., 10°, more than 5° or more than 1°. In some examples, the door 274 is pivoted by approximately 90° between the closed position (e.g., a position substantially tangential to the axis 274) and the open position.

The openable door 274 may be moved by air flow alone or in combination with a powered actuator of the surface cleaning apparatus, e.g., the openable door may be coupled to a micro motor or an electromagnet that is powered when the suction motor is energized. A small amount of power may be used to move the openable door out of the way of air entering the air treatment chamber. Using a powered actuator to move the door 274 may reduce the amount of air watts needed to hold the door open (e.g., saving 1 to 5 air watts or 2 to 3 air watts). Accordingly, air flow may not be used to move the openable door 274.

In some embodiments, moving the openable door out of the way of the air flowing into the air treatment chamber may result in an increased flow of 2 cfm to 15 cfm, 3 cfm to 8 cfm, or 5 cfm to 6 cfm.

It will be appreciated that where the openable door 274 is moved out of the way it no longer acts as the directing member. In some examples, the openable door 274 is moved out of the way and the circular flow is imparted by the portion 280 of the impact wall 230 and/or the deflecting portion of a wall defining part of the front end 184 of the air treatment chamber 160 (e.g., the lower angled wall portion 260). Accordingly, a surface cleaning apparatus 100 may include an openable door 274 operable to close the inlet 180 to the air treatment chamber 160 without the openable door 274 being a directing member in operation of the surface cleaning apparatus 100.

Comparable Treatment Volume and Filter Volume

In accordance with this aspect, the air treatment chamber 160 has a treatment volume upstream of the filter member 168 (e.g., upstream of an impact wall 230 under which the air must pass to reach the filter member 168). The filter member 168 and the treatment volume may be sized relative to one another such that the air is able to move through the treatment volume 250 of the air treatment member 110 fast enough for the circular flow to develop. In some embodiments, the volume of air treatable by the porous filter member 168 and/or the porous dirt separator 162 is sufficient to minimize backpressure.

The volume of air treatable by the porous dirt separator 162 (e.g., the porous filter member 168) may be a function of the surface area of the porous dirt separator 162 (e.g., the surface area of the porous filter member 168) and/or an interior volume of the porous dirt separator 162 (e.g., a hollow porous filter member 168).

As exemplified in FIG. 2, the interior volume 290 of the porous filter member 168 may be commensurable in size to the treatment volume 250 of the air treatment chamber 160. For example, the interior volume 290 may be within an order of magnitude of the treatment volume 250. Commensurable sizes may assist in keeping the air moving through the treatment volume fast enough to generate the circulating flow. This aspect may be used by itself or in combination with one or more of the other aspects set out herein.

The porous dirt separator 162 (e.g., the porous filter member 168) may be a hollow tube-shaped member. The hollow tube-shaped member may have a rectangular cross section (i.e. having one or more planar wall portions), as in the illustrated embodiment (see also FIG. 3), or another cross-sectional shape (e.g., circular or oval).

The porous filter media 168 may be removably mounted in a porous filter holder 216, as disclosed elsewhere herein, or an outer holder 212. As exemplified in FIG. 8, the porous filter 168 may be a hollow tube-shaped member with open ends, and the porous filter holder 216 (or the outer holder 212 or the impact wall 230) may close at least one of the open ends to assist in directing air through the porous filter 168. Alternately, the forward end of the porous filter 168 may be closed. As in the illustrated example, the internal volume 290 may be the volume bounded by the porous filter 168, the volume bounded by the porous filter 168 and the porous filter holder 216, and/or the volume bounded by the porous filer 168, the porous filter holder 216, and a wall (e.g., the rear end 186) of the chamber 160.

In some embodiments, the treatment volume 250 is 0.25 to 3 times the interior volume 290, 0.5 to 2.25 times the interior volume 290, or 1.0-1.5 times the interior volume 290.

Pleated Filter

In accordance with this aspect, the porous dirt separator 162 includes a pleated filter. In some embodiments, the air treatment member includes a porous filter member through which the air flow passes prior to leaving the chamber, and the porous filter member may be a tube-shaped member with longitudinally extending pleats. The pleated filter member may be arranged with the longitudinal axis of the filter member generally parallel with an axis of rotation of a suction motor of the surface cleaning apparatus. The tube-shaped member may have first and second open ends, one of which may be closed and the other open to an outlet of the chamber such that the air flows into an interior volume of the filter member through the pleated walls and out through an end through the chamber outlet. A pleated filter member may present a greater surface area for receiving air flow. Pleats extending generally parallel to the axis of rotation of the suction motor may also contribute to an increased surface area without unduly increasing the height and/or width of the surface cleaning apparatus. This aspect may be used by itself or in combination with one or more of the other aspects set out herein.

As exemplified in FIG. 8, the inner porous filter member 168 may be a pleated member having a plurality of pleats 294. For example, the porous filter member 168 may be a pleated sheet of porous filter media. The porous filter member 168 may have between 0.25 and 5 pleats per inch, between 0.5 and 3 pleats per inch, or between 0.5 and 2 pleats per inch.

The inner porous filter member 168 may be a tube-shaped member having a longitudinal axis 296. In some embodiments, the pleats 294 are linear and extend generally parallel to the longitudinal axis 296.

As exemplified in FIG. 2, the pleats 294 of the filter media may extend generally axially along the longitudinal axis 140 of the apparatus 100 when the pleated filter media 168 is positioned in the filter media holder 216 in an operational position (i.e., the position of FIG. 2). Accordingly, air flow through the pleats is directed non-parallel to the longitudinal axis 140 (e.g., non-parallel to the rotational axis of the suction motor 146).

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

The invention claimed is:

1. A surface cleaning apparatus comprising:
    (a) an air flow path extending from a dirty air inlet to a clean air outlet, the air flow path comprising an inlet conduit having an outlet port and an inlet conduit axis;
    (b) a suction motor positioned in the air flow path;
    (c) an air treatment chamber provided in the air flow path, the air treatment chamber comprising an upper end, a lower end, a front end having an air inlet, a rear end, a longitudinal axis extending between the front and rear ends of the air treatment chamber and a porous filter member provided in the air treatment chamber rearward of the front end, the porous filter member comprising an outlet passage from the air treatment chamber, the porous filter member having an interior volume; and,
    (d) an air impermeable impact wall opposed to the outlet port of the inlet conduit and forward of the porous filter member, the impact wall having a lower end which is spaced from the lower end of the air treatment chamber whereby air flow entering the air treatment chamber from the inlet conduit is directed towards the impact wall,
    wherein the impact wall comprises a deflecting portion that extends downwardly and forwardly at an angle to a plane that is transverse to the longitudinal axis, and
    wherein at least some of the air travels rearwardly between the lower end of the impact wall and the lower end of the air treatment chamber to the porous filter member.

2. The surface cleaning apparatus of claim 1 wherein at least 75% of the air travels rearwardly between the lower end of the impact wall and the lower end of the air treatment chamber to the porous filter member.

3. The surface cleaning apparatus of claim 1 wherein the air treatment chamber comprises a treatment volume positioned between the front end of the air treatment chamber and the impact wall and a gap between the lower end of the impact wall and the lower end of the air treatment chamber defines a sole passage from the treatment volume to the porous filter member.

4. The surface cleaning apparatus of claim 1 wherein the front end comprises a front wall comprising a lower angled wall portion of the front wall, the lower angled wall portion having an upper end that is positioned forward of a lower end of the lower angled wall portion.

5. The surface cleaning apparatus of claim 4 wherein the lower angled wall portion extends forwardly at an angle of 20° to 70°, optionally 30° to 60°, from a plane that is transverse to the longitudinal axis.

6. The surface cleaning apparatus of claim 1 further comprising a directing member associated with the outlet port of the inlet conduit, wherein, in operation, the directing member is in an operation position in which the directing member extends axially inwardly and downwardly at an angle to the longitudinal axis and is positioned to be impacted by air travelling through the inlet conduit.

7. The surface cleaning apparatus of claim 1 wherein the deflecting portion of the impact wall extends downwardly and forwardly at an angle of 5° to 25° to the plane that is transverse to the flow direction.

8. The surface cleaning apparatus of claim 1 wherein the portion of the impact wall comprises a lower lip portion of the impact wall.

9. The surface cleaning apparatus of claim 8 wherein the lower lip portion extends below a lower end of the porous filter member.

10. The surface cleaning apparatus of claim 1 wherein the air treatment chamber comprises a treatment volume positioned between the front end of the air treatment chamber and the impact wall and the treatment volume is 0.25 to 3 times the interior volume, optionally 0.5 to 2.25 times the interior volume or optionally 1.0-1.5 times the interior volume.

11. The surface cleaning apparatus of claim 1 wherein the porous filter member comprises a pleated filter media removable mountable in a porous filter media holder wherein, when the pleated filter media is positioned in the filter media holder, pleats of the filter media extend generally axially.

12. The surface cleaning apparatus of claim 1 wherein the surface cleaning apparatus is a hand vacuum cleaner.

13. A surface cleaning apparatus comprising:
   (a) an air flow path extending from a dirty air inlet to a clean air outlet, the air flow path comprising an inlet conduit having a flow direction, an outlet port and an inlet conduit axis;
   (b) a suction motor positioned in the air flow path;
   (c) an air treatment chamber provided in the air flow path, the air treatment chamber comprising an upper end, a lower end, a front end having an air inlet, a rear end, a longitudinal axis extending between the front and rear ends of the air treatment chamber and a porous filter member provided in the air treatment chamber rearward of the front end, the porous filter member comprising an outlet passage from the air treatment chamber, the porous filter member having an interior volume;
   (d) an air impermeable impact wall opposed to the outlet port of the inlet conduit and forward of the porous filter member, the impact wall having a lower end which is spaced from the lower end of the air treatment chamber whereby air flow entering the air treatment chamber from the inlet conduit is directed towards the impact wall; and,
   (e) a directing member that is associated with the outlet port of the inlet conduit and is rearwardly pivotable about a pivot to an operating position, wherein the air flow path at the outlet port has an upper wall, a lower wall and laterally opposed sidewalls, the pivot is located on the upper wall and wherein a stop member that limits the rearward rotation of the directing member and the stop member is positioned on the upper wall whereby, in operation, the directing member pivots rearward to the operating position in which the directing member is at an angle of at least 10° from the flow direction whereby, in the operation position, the directing member extends axially inwardly and downwardly and is positioned to be impacted by air travelling through the inlet conduit.

14. The surface cleaning apparatus of claim 13 wherein a portion of the impact wall extends downwardly and forwardly at an angle to a plane that is transverse to the longitudinal axis.

15. The surface cleaning apparatus of claim 13 wherein the directing member comprises an openable door provided at the outlet port of the inlet conduit, the openable door is moveable from a closed position in which the moveable door closes the inlet conduit and the operating position.

16. The surface cleaning apparatus of claim 15 wherein, in the operating position, the directing member is at an angle of at least 15° from the flow direction.

* * * * *